(12) United States Patent
Sudo

(10) Patent No.: US 12,744,044 B2
(45) Date of Patent: Sep. 22, 2026

(54) SPEECH RECOGNITION DEVICE, SPEECH RECOGNITION METHOD, AND STORAGE MEDIUM

(71) Applicant: HONDA MOTOR CO., LTD., Tokyo (JP)

(72) Inventor: Yui Sudo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 128 days.

(21) Appl. No.: 18/782,037

(22) Filed: Jul. 24, 2024

(65) Prior Publication Data

US 2025/0046312 A1 Feb. 6, 2025

(30) Foreign Application Priority Data

Aug. 1, 2023 (JP) ................................ 2023-125530

(51) Int. Cl.
*G10L 15/26* (2006.01)
*G10L 25/30* (2013.01)

(52) U.S. Cl.
CPC .............. *G10L 15/26* (2013.01); *G10L 25/30* (2013.01)

(58) Field of Classification Search
None
See application file for complete search history.

(56) References Cited

U.S. PATENT DOCUMENTS

2023/0368779 A1* 11/2023 Tripathi .................. G10L 15/26

FOREIGN PATENT DOCUMENTS

JP 2023-092836 7/2023

OTHER PUBLICATIONS

Yao et al., WeNet: Production Oriented Streaming and Non-streaming End-to-End Speech Recognition Toolkit, 2021 (Year: 2021).*

* cited by examiner

*Primary Examiner* — Nafiz E Hoque
(74) *Attorney, Agent, or Firm* — Amin, Turocy & Watson, LLP

(57) ABSTRACT

A speech recognition device is a speech recognition device for performing speech recognition using an end-to-end model and includes an encoder that is a model that converts an input speech signal into a characteristic expression, a decoder that is a model that converts speech data into text using an output of the encoder, and a learning unit that randomly selects a block length of the speech signal input to the encoder and causes the encoder and the decoder to learn.

5 Claims, 11 Drawing Sheets

FIG. 1

| OFFLINE DECODER OUTPUT HYPOTHESIS | SCORE |
|---|---|
| "OHAYOUGO" | 0.40 |
| "OHAYOUGA" | 0.50 |
| "OHAYOUGAJI" | 0.05 |
| "OHAYOURO" | 0.05 |

| ONLINE DECODER OUTPUT HYPOTHESIS | SCORE |
|---|---|
| "OHAYOUGO" | 0.60 |
| "OHAYOUGA" | 0.30 |
| "OHAYOUGAJI" | 0.10 |
| "OHAYOURO" | 0.01 |

| Mode | Method | eval1 | eval2 | eval3 | ave |
|---|---|---|---|---|---|
| Online | Separated | 7.44 | 5.46 | 12.70 | 8.53 |
| | Cascaded encoder [20] | 8.11 | 5.62 | 12.66 | 9.13 |
| | Parallel encoder (ours) | **7.24** | 5.53 | 12.40 | 8.39 |
| | +DBT (ours) | 7.50 | **5.45** | **12.20** | **8.38** |
| Offline | Separated | 5.78 | 4.15 | 9.94 | 6.62 |
| | Cascaded encoder [20] | 5.72 | 4.07 | 9.81 | 6.53 |
| | Parallel encoder (ours) | 5.72 | 4.11 | 10.33 | 6.72 |
| | +2-pass rescoring | 5.64 | 4.13 | 10.25 | 6.67 |
| | +1-pass (ours) | 5.71 | 4.03 | 10.15 | 6.63 |
| | +DBT (ours) | 5.65 | 4.06 | 9.87 | 6.53 |
| | +DBT+1-pass (ours) | **5.55** | **3.89** | **9.65** | **6.37** |

Figure 11:
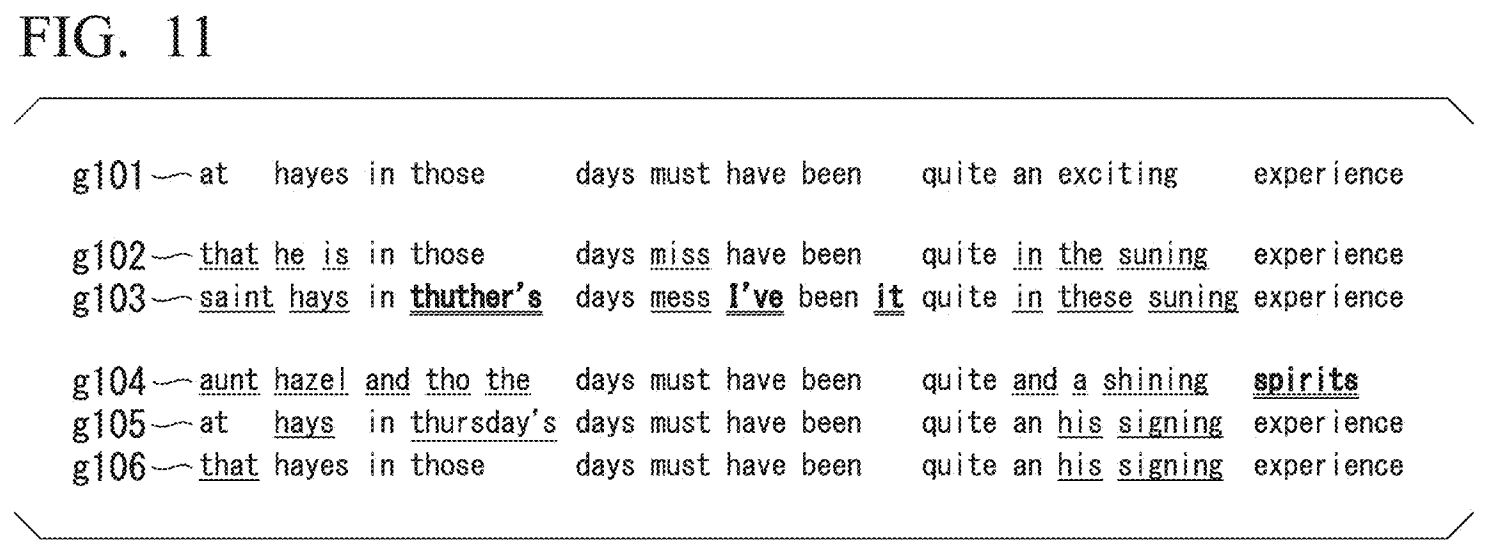

FIG. 11 g101 — at hayes in those days must have been quite an exciting experience g102 — that he is in those days miss have been quite in the suning experience
g103 — saint hays in thuther's days mess I've been it quite in these suning experience g104 — aunt hazel and tho the days must have been quite and a shining spirits
g105 — at hays in thursday's days must have been quite an his signing experience
g106 — that hayes in those days must have been quite an his signing experience

FIG. 13

| Block size | Block length(ms) | SEPARATED MODEL CER | SEPARATED MODEL ED(ms) | MODEL(WITH DB LEARNING) IN EMBODIMENT CER | MODEL(WITH DB LEARNING) IN EMBODIMENT ED(ms) |
|---|---|---|---|---|---|
| 20 | 800 | 8.53 | 300 | 8.38 | 290 |
| 40 | 1600 | 9.27 | 470 | 7.95 | 460 |
| 80 | 3200 | 10.23 | 720 | 7.93 | 710 |

CER
Blocksize
g211
g212
g213
8.2
8.0
7.8
7.6
7.4
7.2
7.0
6.8
6.6
6.4
6.2
0
10
20
30
40
50
60
70
80

SPEECH RECOGNITION DEVICE, SPEECH RECOGNITION METHOD, AND STORAGE MEDIUM

CROSS-REFERENCE TO RELATED APPLICATION

Priority is claimed on Japanese Patent Application No. 2023-125530, filed Aug. 1, 2023, the content of which is incorporated herein by reference.

BACKGROUND OF THE INVENTION

Field of the Invention

The present invention relates to a speech recognition device, a speech recognition method, and a storage medium.

Description of Related Art

Two types of speech recognition technology including online recognition in which speech recognition is sequentially performed for each speech block, and offline recognition in which speech recognition is performed using an entire utterance have been developed and put into practical use (for example, see Patent Document 1 below).

[Patent Document 1] Japanese Unexamined Patent Application, First Publication No. 2023-92836

SUMMARY OF THE INVENTION

However, although the online recognition has a fast response, the performance of the online recognition is often poorer than that of the offline recognition. However, the offline recognition may have a poorer performance than the online recognition depending on the utterance. Thus, speech recognition using an E2E model of the related art has a problem in robustness.

An aspect of the present invention has been made in view of the above problem, and an object of the present invention is to provide a speech recognition device, a speech recognition method, and a storage medium capable of improving robustness of speech recognition using an E2E model.

In order to solve the above problem and achieve the related object, the present invention adopts the following aspects.

(1) A speech recognition device according to an aspect of the present invention is a speech recognition device for performing speech recognition using an end-to-end model, the speech recognition device including: an encoder that is a model that converts an input speech signal into a characteristic expression; a decoder that is a model that converts speech data into text using an output of the encoder; and a learning unit configured to randomly select a block length of the speech signal input to the encoder and cause the encoder and the decoder to perform learning.

(2) In the aspect (1), the encoder may include a first encoder configured to perform processing online and a second encoder configured to perform processing offline, the decoder may include a first decoder configured to perform processing online and a second decoder configured to perform processing offline, and the speech recognition device may further include: an integration unit configured to rescore an output of the first decoder and an output of the second decoder at the time of inference to output a final recognition result.

(3) In the aspect (2), the second decoder may integrate an output of the first encoder with an output of the second encoder at the time of training to perform learning of the second decoder.

(4) In the aspect (3), the second decoder may stack the output of the first encoder and the output of the second encoder in a vertical direction.

(5) In the aspect (2), the integration unit may perform inference on the speech data acquired using the second decoder to calculate a first score, calculate a second score for the same character string as a character string inferred by the second decoder, by using the first encoder, calculate a weighted sum of the first score and the second score, and perform rescoring to determine text to be inferred.

(6) A speech recognition method according to an aspect of the present invention is a speech recognition method for a speech recognition device for performing speech recognition using an end-to-end model, the speech recognition method including: converting, by an encoder, an input speech signal into a characteristic expression; converting, by a decoder, speech data into text using an output of the encoder; and randomly selecting, by a learning unit, a block length of the speech signal input to the encoder and causing the encoder and the decoder to perform learning.

(7) A storage medium according to an aspect of the present invention stores a program causing a computer for a speech recognition device for performing speech recognition using an end-to-end model including an encoder and a decoder to execute: a first conversion step of converting an input speech signal into a characteristic expression; a second conversion step of converting speech data into text using an output of the first conversion step; and a step of randomly selecting a block length of the speech signal input to the encoder and causing the encoder and the decoder to perform learning. According to the aspects (1) to (7), speech recognition using the E2E model can improve the robustness.

BRIEF DESCRIPTION OF THE DRAWINGS

FIG. 1 is a diagram showing an overview of speech recognition processing and a configuration of the related art.

FIG. 11 is a diagram showing an example of text that has been subjected to speech recognition using a scheme of the related art and a scheme of the present embodiment.

FIG. 13 is a diagram showing a speech recognition rate and an ED of a model of the present embodiment with DB learning and a separated model.

DETAILED DESCRIPTION OF THE INVENTION

Figure 2:
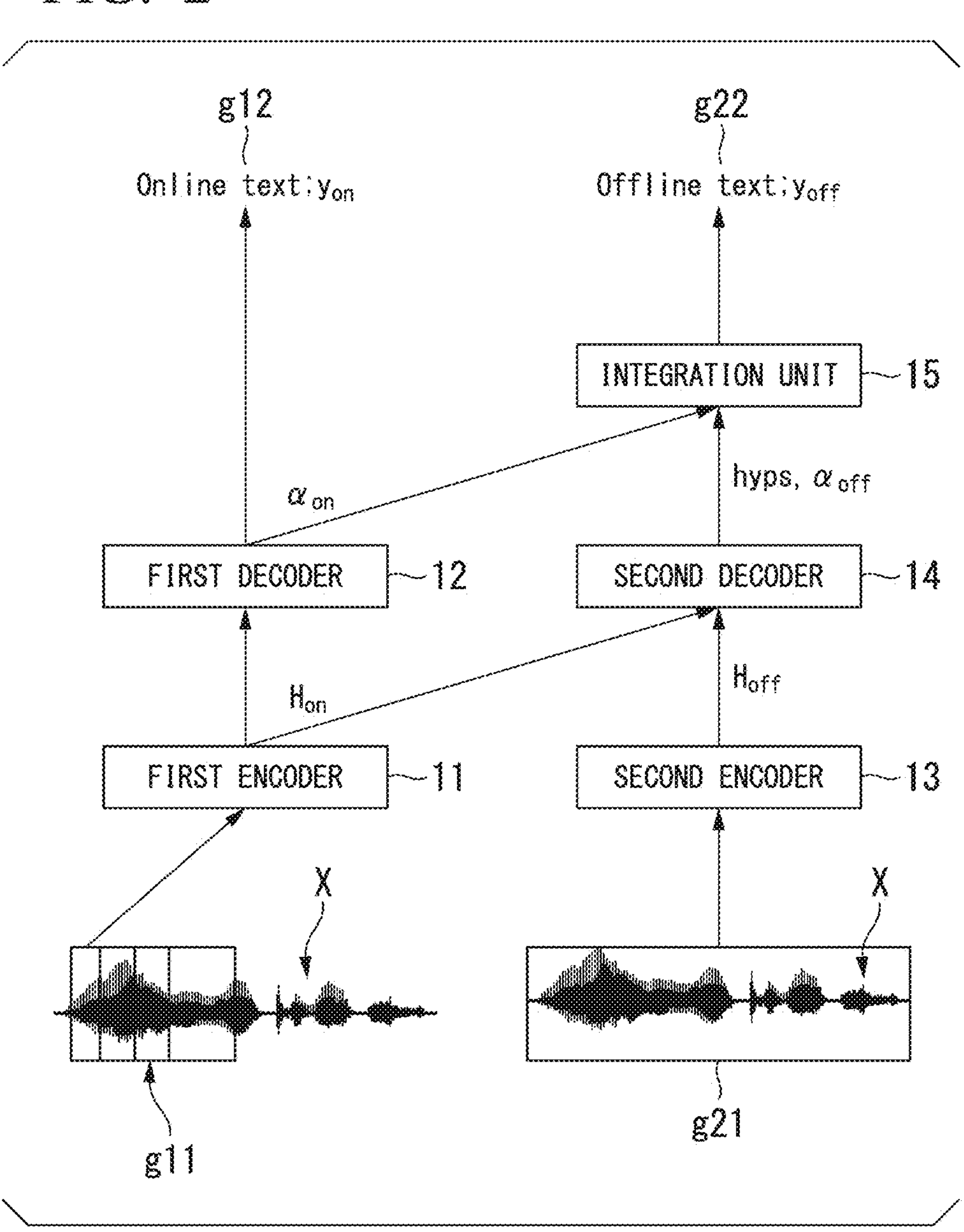
FIG. 2 is a diagram showing an overview of speech recognition processing and a configuration according to an embodiment.

Hereinafter, embodiments of the present invention will be described with reference to the drawings. In the drawings used in the following description, a scale of each member is changed appropriately in order to cause each member to have a recognizable size.

In all the figures for describing the embodiment, units having the same functions are denoted by the same reference signs, and repeated descriptions will be omitted.

"On the basis of XX" as used herein means "based on at least XX", and includes "based on other elements in addition to XX". "On the basis of XX" is not limited to a case where XX is used directly, and also includes "based on a result of performing calculation or processing on XX". "XX" is an arbitrary element (for example, arbitrary information).

(E2E Model)

First, speech recognition of an end-to-end (E2E) model will be described.

In recent years, in a speech recognition technology, the end-to-end (E2E) model has been attracting attention instead of a DNN-HMM (Deep Neural Network-Hidden Markov model) model of the related art. Deep learning using the E2E model is to replace a machine learning system requiring a plurality of stages of processing from reception of input data to output of a result with a single large neural network including a plurality of layers and modules that perform various types of processing, and perform learning.

In such speech recognition using an E2E model, there are online speech recognition and offline speech recognition. An online model can be used for real-time transcription, for example, because the speech recognition is performed with a minimal latency. An offline model waits until the end of utterance of speech before processing, but is used, for example, for generation of transcription.

In recent years, several attempts have been made to improve performance by combining the online model with the offline model.

Further, in a speech recognition device of the related art, learning has been performed with a fixed block size. However, since a length of actual speech varies depending on a situation, the speech recognition device of the related art that performs learning using the block size having the same length has not been able to adequately handle this.

Therefore, in the present embodiment, as will be described below, results of the online recognition and the offline recognition are integrated, and block length is randomly selected for learning.

Overview of Present Embodiment

Here, an overview of the related art and an overview of the present embodiment will be described.

Figure 1:
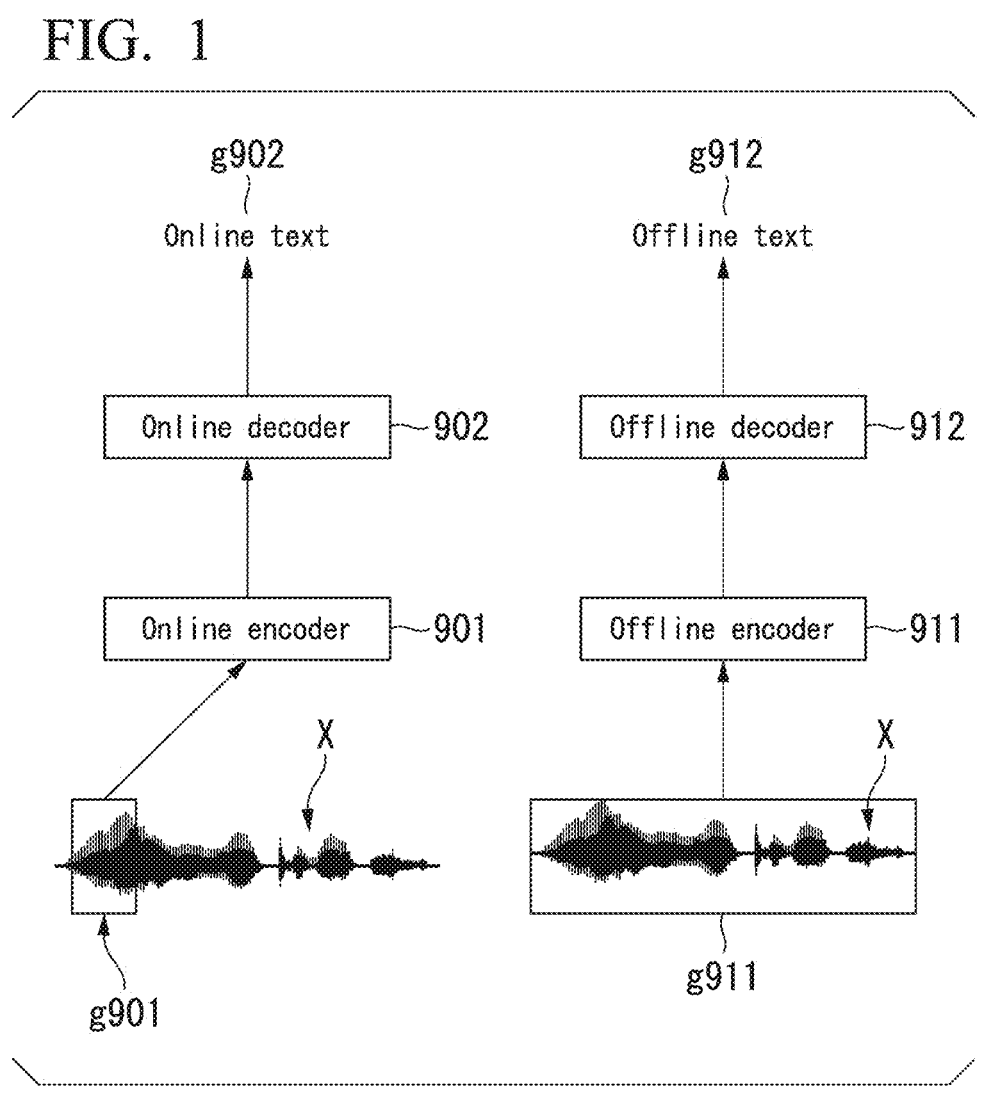

FIG. 1 is a diagram showing an overview of speech recognition processing and a configuration of the related art. In the related art, online speech recognition and offline speech recognition are performed separately. A speech signal X is input to an online encoder 901 and an offline encoder 911. In online processing, learning and recognition are performed with a fixed block length, as indicated by reference sign g901. In offline processing, processing is performed on each sentence, for example, as indicated by reference sign g911.

In online processing, the speech signal X for each fixed block length is input to the online encoder 901, and the encoded signal is input to the online decoder 902. The online decoder 902 sequentially outputs the text subjected to the online processing. In offline processing, the speech signal X is input to the offline encoder 911, and the encoded signal is input to the offline decoder 912. The offline decoder 912 outputs text subjected to the offline processing.

Figures 3, 4, 5:
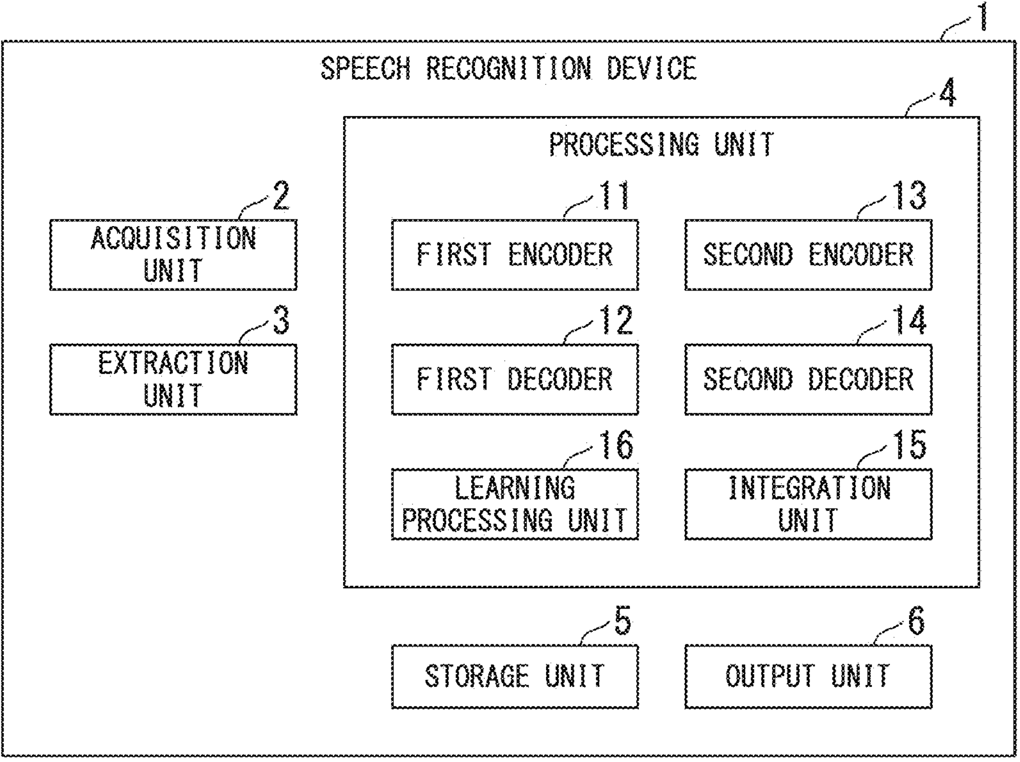
FIG. 3 is a diagram showing a configuration example of a speech recognition device according to an embodiment.
FIG. 4 is a diagram showing an example of a hypotheses and a score generated by an offline decoder.
FIG. 5 is a diagram showing an example of the hypotheses and the score generated by an online decoder.

FIG. 3 is a diagram showing an overview of speech recognition processing and a configuration according to the present embodiment.

In the present embodiment, the online processing and the offline processing are performed simultaneously. The first encoder 11 for online processing performs encoding processing on an input speech signal X for each phrase having a predetermined length that is input, and outputs a processing result to the first decoder 12 for online processing and the second decoder 14 for offline processing. At the time of training, the first encoder 11 learns with the changed block size of the speech signal, as indicated by reference sign g11. The first decoder 12 sequentially outputs a result of the decoding processing (reference sign g12) and outputs the result to an integration unit 15.

The second encoder 13 for offline processing performs encoding processing on the input speech signal X for each sentence, for example, and outputs a processing result to the second decoder 14 for offline processing. The second encoder 13 performs learning using, for example, a speech signal of one sentence at the time of training. The second decoder 14 performs learning using an output of the first encoder 11 and an output of the second encoder 13 at the time of training. The second decoder 14 holds the output of the first encoder 11, and performs learning using the output of the first encoder 11 and the output of the second encoder 13, for example, after the output for one sentence is held.

The second decoder 14 performs decoding processing on an input result, and outputs a decoding processing result to the integration unit 15.

The integration unit 15 integrates an output of the first decoder 12 with an output of the second decoder 14, and outputs an integration result (reference sign g22).

Processing of each unit, reference signs in FIG. 2, and the like will be described later.

In general, in the E2E model, an encoder is a model that converts speech data into a characteristic expression. The encoder extracts, for example, frequency components in a time domain and a frequency domain of the speech data, and converts the extracted frequency components into vectors (for example, 256th order) representing characteristics of a speech.

Generally, in the E2E model, the decoder is a model that converts speech data into text using an output of the encoder.

Thus, in the E2E model, the encoder and decoder work together to perform speech recognition. However, each model needs to be trained in advance using a corpus or the like.

In the present embodiment, the online model and the offline model are integrated as one model and learning is performed. That is, the second decoder 14 for offline uses the output of the first encoder 11 and the output of the second encoder 13. This integration is performed both at the time of learning and at the time of speech recognition (at the time of inference). A timing of the integration is, for example, when one utterance is completed, that is, when offline processing is completed. Therefore, the second decoder 14 holds the output of the first encoder 11 until the offline processing is completed.

In the present embodiment, the block size is randomly changed at the time of input to the first encoder 11 for online. Examples of the block size include 5, 10, and 20. In speech recognition, the block size is fixed to a predetermined size.

Further, in the present embodiment, the integration is also performed at the time of speech recognition. That is, the integration unit 15 integrates the output of the first decoder 12 with the output of the second decoder 14 to perform inference (text estimation).

(Speech Recognition Device)

Next, the speech recognition device 1 of the present embodiment will be described.

FIG. 1 is a diagram showing a configuration example of a speech recognition device according to the present embodiment. As shown in FIG. 1, the speech recognition device 1 includes, for example, an acquisition unit 2, an extraction unit 3, a processing unit 4, a storage unit 5, and an output unit 6.

The processing unit 4 includes, for example, the first encoder 11, the first decoder 12, the second encoder 13, the second decoder 14, the integration unit 15, and a learning processing unit 16.

The acquisition unit 2 acquires the speech signal. The speech signal may be recorded data or may be a speech signal collected in real time. When sound is collected, the acquisition unit 2 is a microphone.

At the time of training, the extraction unit 3 performs extraction (cut-out) from the acquired speech signal with the randomly changed block length, for example, and outputs the extracted speech signal to the first encoder 11. In the speech recognition, the extraction unit 3 extracts (cuts out) a signal for each predetermined block length from the acquired speech signal, and outputs the extracted speech signal to the first encoder 11. The extraction unit 3 extracts, for example, a speech signal for one sentence from the acquired speech signal at the time of recognizing a training center, and outputs the extracted speech signal to the second encoder 13. The extraction unit 3 performs an utterance section detection of a well-known scheme to extract, for example, a speech signal for one sentence.

The processing unit 4 performs training (learning) for each unit using the input speech signal. The processing unit 4 performs speech recognition processing using each unit that has learned.

The first encoder 11 is an encoder for online processing, and is, for example, a Blockwise Conformer Encoder. The first encoder 11 outputs the hidden state $H_{on}$ to the first decoder 12 and the second decoder 14. A training method for the first encoder 11, and the hidden state $H_{on}$, and the like will be described later.

The first decoder 12 is a decoder for online processing, and is, for example, a transducer decoder. A transducer is one of offline-based processing schemes. The first decoder 12 outputs an online recognition result $y_{on}$ (text). The first decoder 12 outputs the recognition result (text) and a score don indicating the validity of the recognition result to the integration unit 15. A method training for the first decoder 12 and the like will be described later. The score is, for example, a value between 0 and 1.00.

The second encoder 13 is an encoder for offline processing, and is, for example, a full-context conformer encoder. A conformer is one of the offline-based processing schemes. The second encoder 13 outputs a hidden state $H_{off}$ to the first decoder 12 and the second decoder 14. A training method for the second encoder 13, a score calculation method, the hidden state $H_{off}$, and the like will be described later.

The second decoder 14 is a decoder for offline processing, and is, for example, a transducer decoder. The second decoder 14 outputs the recognition result (text), a score $\alpha_{off}$ indicating the validity of the recognition result, and a hypothesis hyps that is a beam search result to the integration unit 15. Beam search is processing for searching for character candidates for one character at a time in recognition, and obtaining a probability of certainty thereof. At this time, top four character candidates, for example, are selected. A training method for the second decoder 14, a score calculation method, a beam search method, and the like will be described later.

The integration unit 15 integrates an output result of the first decoder 12 with an output result of the second decoder 14 and outputs a speech recognition result $y_{off}$ (text). A processing method for the integration unit 15 will be described later.

The learning processing unit 16 trains each unit at the time of training. The learning processing unit 16 performs speech recognition processing using each unit that has been trained at the time of recognition.

The storage unit 5 stores programs, thresholds, equations, and the like used at the time of training and the time of speech recognition.

The output unit 6 outputs a recognition result output by the integration unit 15 to an external device. The external device is, for example, an image display device, a personal computer, a mobile terminal, or a dedicated terminal.

(Encoder)

Next, processing of the first encoder 11 and the second encoder 13 will be further described.

The second encoder 13 is, for example, the full-context conformer encoder.

The conformer encoder is configured of, for example, two convolution layers for downsampling, a linear projection layer, and a position encoding layer, followed by N conformer blocks. The convolution layer receives a speech feature sequence (speech feature amount) X and subsamples the speech feature sequence. The conformer block converts the sampled feature sequence into a hidden state $H_{off}=[h_1, \ldots, h_T]$ with T lengths using Equation (1) below. Thus, the input to the encoder is not the speech signal itself, but is an acoustic feature quantity sequence X extracted from the speech signal. As shown in FIG. 2, the second encoder 13 outputs this hidden state $H_{off}$. The acquisition unit 2 calculates the acoustic feature quantity by calculating, for example, a static melscale log spectrum (MSLS), a delta MSLS, and one delta power every predetermined time (for example, 10 ms) to calculate the acoustic feature quantity. The MSLS is obtained by performing inverse discrete cosine transform on Mel Frequency Cepstrum Coefficient (MFCC) using a spectral feature quantity as a feature quantity of the speech signal.

$$H_{off} = FullEnc(X) \tag{1}$$

Each conformer block includes, for example, two feed-forward layers, a multi-head self-attention layer, a convolution layer, a layer normalization layer, and a residual connection.

The first encoder 11 can perform block-wise calculation in a streaming scenario. A b-th block of an input speech feature sequence $X_b$ is defined as in Equation (2) below.

$$X_b = (X_t \mid t = (b-1)L_{hop}+1, \ldots , (b-1)L_{hop}+L_{block}+1) \tag{2}$$

In Equation (2), $L_{block}$ represents the block size, and $L_{hop}$ represents a hop length which is a length by which a window function is shifted.

For each block containing a hidden state with an L block length, a hidden state corresponding to the b-th block is encoded. This processing is performed sequentially, and finally a hidden state with a T block length as shown in Equation (3) below is obtained. As shown in FIG. 2, the first encoder 11 outputs this hidden state $H_{on}$.

$$H_{on} = BlockEnc(X) \tag{3}$$

(Decoder)

Next, processing of the first decoder 12 and the second decoder 14 will be further described.

The first decoder 12 and the second decoder 14 are, for example, transducer decoders.

The transducer decoder is configured of a prediction network and a combination network, for example. The prediction network generates a high-level representation $g_s$ by conditioning an immediately preceding non-blank token sequence $g_{s-1}$. s represents an index of a non-blank token that is described as follows.

$$g_s = PredNet(g_{s-1}) \tag{4}$$

A joint network is a feed forward network that is a combination of a t-th hidden state vector $h_t$ output from Equation (1) or Equation (3) and $g_s$ output from Equation (4), and is described as in Equation (5) below.

$$z_{t,s} = JointNet(h_t, g_s) \tag{5}$$

A transducer model marginalizes a potential alignment z that outputs a text string y, as in Equation (6) below.

$$P(y \mid H) = \sum_{z \in Z(y)} P(z \mid H) = \sum_{z \in Z(y)} \left[ \prod_{i=1}^{T+S} P(z_i \mid h_{t_i}, h_{s_i}) \right] \tag{6}$$

In Equation (6), S represents a total length of a complete token string, and i represents a position of an alignment pass having a length (T+S), which are designated by a $t_i$-th decoder state and a $s_i$-th token, respectively. Π is a product of P(*) from i=1 to (T+S).

For both online and offline transducers, model parameters are optimized by minimizing a negative log-likelihood as in Equations (7) and (8) below.

$$L_{on} = -\log P_{on}(y_{on} \mid H_{on}) \tag{7}$$

$$L_{off} = -\log P_{off}(y_{off} \mid H_{off}) \tag{8}$$

In Equation (7), $y_{on}$ is an output (text) of the first decoder 12 through online processing. $y_{off}$ is an output (text) of the second decoder 14 through offline processing. $L_{on}$ is a model parameter of the first decoder 12. $L_{off}$ is a model parameter of the second decoder 14.

As described above, the speech recognition device 1 of the present embodiment includes a blockwise encoder and a full context encoder that can support both an online mode and an offline mode. A speech feature sequence X is supplied to the blockwise encoder and the full context encoder in parallel, as in FIG. 2.

In the online mode, the blockwise encoder generates a hidden state vector $H_{on}$ supplied to the online decoder, similar to a cascaded online RNN-T of the related art (see reference 1, for example).

Reference 1: A. Narayanan, Tara N. Sainath, et al., "Cascaded encoders for unifying streaming and non-streaming ASR", in Proc. ICASSP, 2020, pp. 5629-5633

In the offline mode, the hidden state vectors $H_{on}$ and $H_{off}$ in Equations (1) and (3) are stacked in a vertical direction as in the Equations (8) and (9) below, unlike a cascaded encoder of the related art. $H_{on}$, $H_{off}$, and $H_{off}^{para}$ all have the same length. Since time x dimension is set, the hidden state vectors are stacked in a vertical direction, and $H_{off}^{para}$ becomes a 512-dimensional hidden state vector, for example, when the dimensions before Concat are 256.

$$H_{off}^{casc} = FullEnc(H_{on}) \tag{9}$$

$$H_{off}^{para} = concat(H_{on}, H_{off}) \tag{10}$$

casc represents a cascade connection, and para represents a parallel connection. In Equation (10), concat($H_{on}$, $H_{off}$) integrates the hidden state vectors $H_{on}$ and $H_{off}$. Equation (10) shows processing for integrating the output of the first encoder 11 with the output of the second encoder 13. The first encoder 11 and the second encoder 13 each output a hidden state vector which is a 256-dimensional vector, at each time. For example, when 10 frames are output, 10 256-dimensional vectors are output. For example, the second decoder 14 vertically stacks a 256-dimension×10 vector output from the first encoder 11 and a 256-dimension×10 vector output from the second encoder 13 so that these are integrated as a 512-dimension×10 vector.

A structure of the present embodiment can avoid the accumulation of errors that often occur in a cascade structure. In the present embodiment, the blockwise encoder and the full context encoder are designed with a concept that the blockwise encoder and the full-context encoder can better extract a local feature and a global feature. That is, in the present embodiment, the hidden state vectors of both the encoders $H_{on}$ and $H_{off}$ are integrated so that an offline mode using both the local feature and the global feature becomes possible.

With multitask learning of the online output and the offline output, it is possible to improve the robustness of the blockwise encoder, as described below. Further, in the present embodiment, one-pass beam search which will be described later is used to further improve the performance of the offline mode, as described below. In the present embodiment, separate transducer decoders were used to avoid the online mode and the offline mode from interfering with each other. The transducer decoder may be shared depending on usage conditions.

(Integrated Learning Method)

The model (the encoder and the decoder) of the present embodiment is optimized by multitask learning using a weighted sum of losses using Equation (11) below, as shown in Equations (7) and (8).

$$L = \lambda L_{on} + (1 - \lambda) L_{off} \tag{11}$$

In Equation (11), λ represents a learning weight. In the present embodiment, dynamic block (DB) learning in which $L_{block}$ in Equation (2) is dynamically changed is used. In the DB training performed in the present embodiment, a block size of each batch is randomly selected from $[L_{min}-L_{max}]$ (for example, a predetermined range) during training.

Through this processing, according to the present embodiment, it is possible to improve the robustness of the offline mode by increasing a variation in an output of the blockwise encoder at the time of learning. Further, according to the present embodiment, it is also possible to flexibly select the block size during inference without compromising the performance. That is, according to the present embodiment, the block size can be flexibly adjusted according to an accuracy or latency requirement.

Next, the one-pass beam search performed by the integration unit 15 will be described.

The integration unit 15 calculates a score using an offline model (the second decoder 14 for offline) and generates a hypothesis for the speech recognition result. Further, the integration unit 15 calculates a probability (score) for a character string that is the same as the character string subjected to hypothesis in the offline model, using the online model (the first decoder 12 for online).

In the present embodiment, the one-pass beam search in which online and offline transducer decoders are combined is performed to improve the performance of the offline mode. In the present embodiment, the hypothesis is scored using two RNN-T decoders, unlike a one-pass beam search scheme of the related art (see Reference 2, for example). In a label synchronous one-pass beam search of the related art (see Reference 3, for example), probabilities of all possible alignment passes are calculated in connectionist temporal classification (CTC) prefix scoring. On the other hand, in the present embodiment, this inefficient scoring is avoided by using time synchronization.

Reference 2; Brian Yan, Siddharth Dalmia, et al., "CTC Alignments Improve Autoregressive Translation", arXiv preprint arXiv: 2210.05200, 2022

Reference 3: S. Watanabe, T. Hori, et al., "Hybrid CTC/Attention Architecture for End-to-End Speech Recognition", IEEE Journal of Selected Topics in Signal Processing, vol. 11, no. 8, pp. 1240-1253, 2017

FIG. 4 is a diagram showing an example of the hypotheses and the score generated by the offline decoder. FIG. 5 is a diagram showing an example of the hypotheses and the score generated by the online decoder. In this example, in the offline decoder, a score of "OHAYOUGO" is 0.40, which is lower than a score 0.50 of "OHAYOUGA". However, in the online decoder, the score of "OHAYOUGO" is 0.60, which is lower than a score 0.30 of "OHAYOUGA". The examples shown in FIGS. 4 and 5 are an example.

(Training Processing Procedure)

Figure 6:
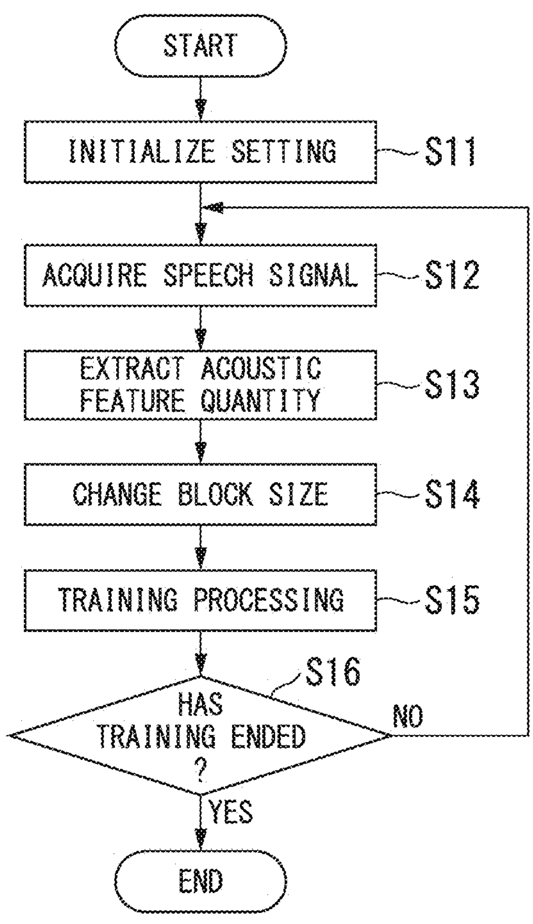
FIG. 6 is a flowchart of training processing of the speech recognition device according to the embodiment.

Next, an example of a training processing procedure will be described. FIG. 6 is a flowchart of training processing of the speech recognition device according to the present embodiment.

(Step S11) The processing unit 4 initializes the parameters of the respective models (the encoder, the decoder, and the integration unit).

(Step S12) The acquisition unit 2 acquires the speech signal.

(Step S13) The acquisition unit 2 extracts the acoustic feature quantity from the acquired speech signal using a well-known method.

(Step S14) The learning processing unit 16 changes the block size in which the speech signal is cut out, for example, randomly.

(Step S15) The learning processing unit 16 performs speech recognition using the calculated acoustic feature sequence X to perform training processing of the model (the first encoder 11, the first decoder 12, the second encoder 13, and the second decoder 14). The processing unit 4 simultaneously performs the online processing and the offline processing.

(Step S16) The learning processing unit 16 determines whether the training processing has ended. For example, the learning processing unit 16 determines that training has ended when the training has been performed a predetermined number of times. When the training processing has ended (step S16; YES), the learning processing unit 16 ends the training processing. When the training processing has not ended (step S16; NO), the learning processing unit 16 returns to the processing of step S12.

(Speech Recognition Processing Procedure)

Figure 7:
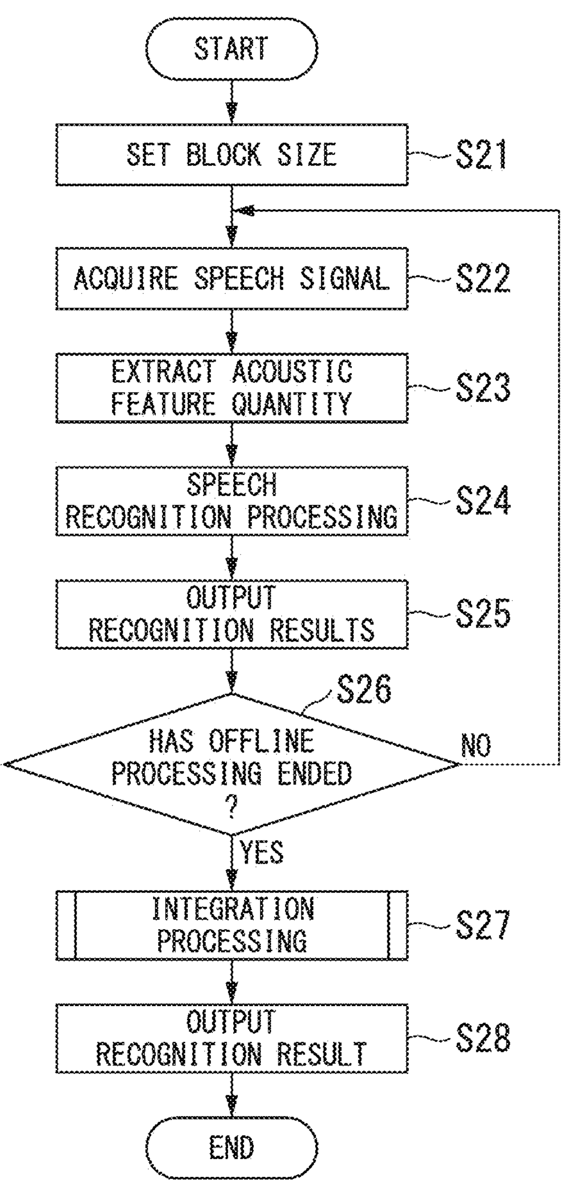
FIG. 7 is a flowchart of speech recognition processing in the speech recognition device according to the embodiment.

Next, an example of a speech recognition processing procedure will be described. FIG. 7 is a flowchart of the speech recognition processing in the speech recognition device according to the present embodiment.

(Step S21) The processing unit 4 sets the block size used in the online processing to a predetermined value.

(Step S22) The acquisition unit 2 acquires the speech signal.

(Step S23) The acquisition unit 2 extracts the acoustic feature quantity from the acquired speech signal using a well-known scheme.

(Step S24) The processing unit 4 performs the speech recognition processing using the learned model. The processing unit 4 simultaneously performs the online processing and the offline processing.

(Step S25) The first decoder 12 sequentially outputs the recognition result subjected to the online processing via the output unit 6.

(Step S26) The processing unit 4 determines whether the offline processing has ended. When the offline processing has ended (step S26; YES), the processing unit 4 proceeds to the processing of step S27. When the offline processing has not ended (step S26; NO), the processing unit 4 returns to the processing of step S22.

(Step S27) The integration unit 15 integrates the output of the first decoder 12 with the output of the second decoder 14. The processing performed by the integration unit 15 will be described later.

(Step S27) The processing unit 4 outputs a recognition result which is a result of the integration unit 15 integrating the results of the online processing and the offline processing, via the output unit 6.

Here, the text output by the speech recognition device 1 at the time of speech recognition will be described.

The first decoder 12 for online of the speech recognition device 1 sequentially recognizes and outputs speech data for each block that is input for each predetermined block size. In parallel therewith, the second decoder 14 for offline performs speech recognition on one sentence when the utterance of the one sentence is captured. In response thereto, the integration unit 15 integrates text for one sentence processed online (for example, reference sign g104 in FIG. 11) with text for one sentence processed offline (for example, reference sign g105 in FIG. 11) and outputs resultant text as a final recognition result (for example, g106 in FIG. 11).

The procedure of the training method and the procedure of the speech recognition method described above are examples, and the present invention is not limited thereto. For example, the speech recognition device 1 may perform several processing in parallel.

(Example of Processing Procedure of Integration Unit)

Figure 8:
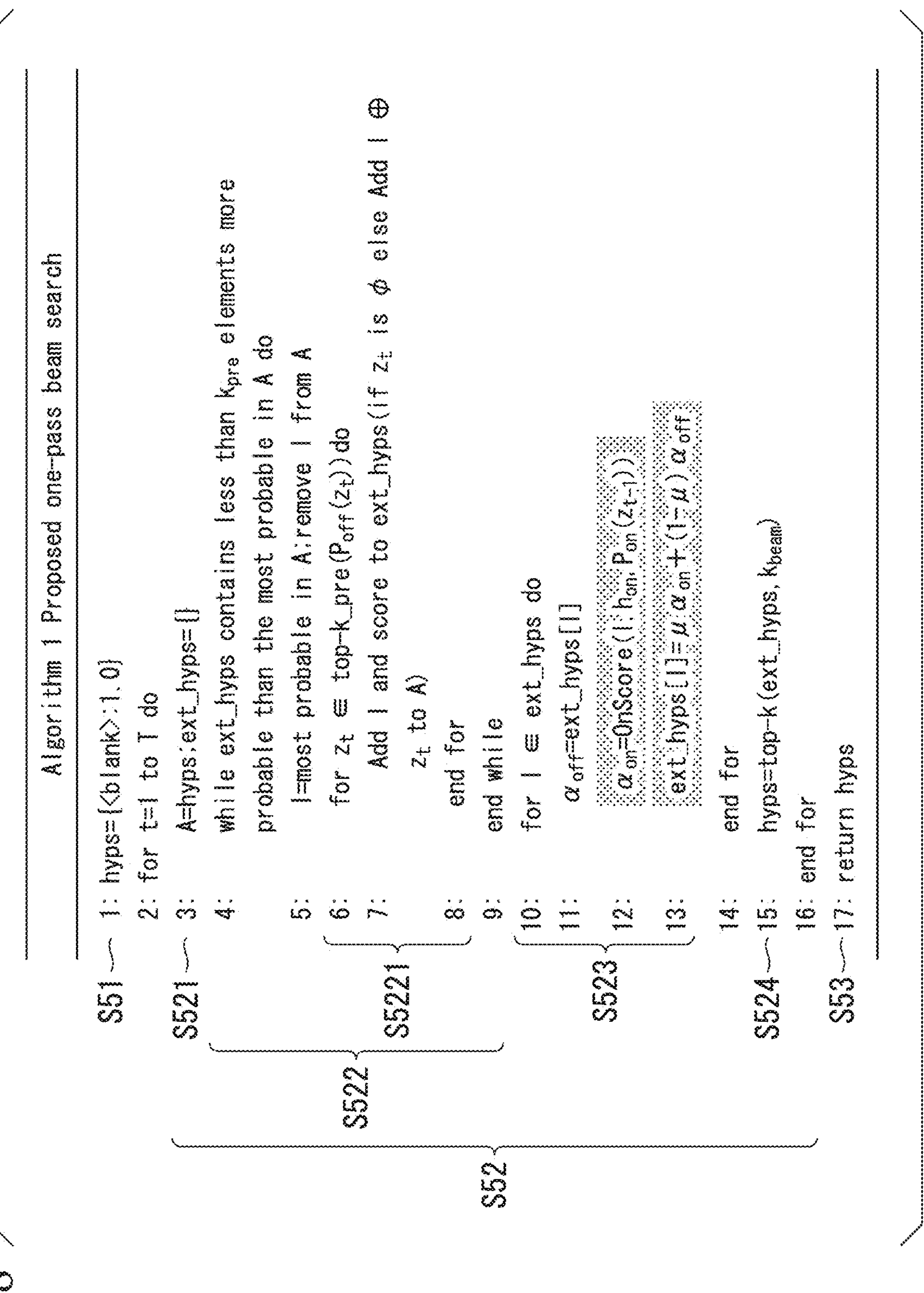
FIG. 8 is a diagram illustrating an example of a program of a processing procedure performed by an integration unit according to the embodiment.

Next, an example of a processing procedure performed by the integration unit 15 in step S27 will be described. FIG. 8 is a diagram illustrating an example of a program of a processing procedure performed by the integration unit according to the present embodiment.

The integration unit 15 initializes the hypothesis hyps (step S51).

The integration unit 15 performs processing on 3rd to 15th lines from t=1 to t=T (step S52). In this processing, for example, when "OHAYOU" can be predicted at time t=t−1, characters after the "OHAYOU" are predicted at the next time t=t. In the process of step S52, the integration unit 15 applies the hypothesis hyps obtained at time t−1 to A, and initializes ext_hyps, which is a hypothesis obtained at a current time (step S521). The hypothesis hyps obtained at time t−1 is, for example, "OHAYOU." The hypothesis ext_hyps obtained at the current time is, for example, a hypothesis in which the next character of "OHAYOU" is added.

In the process of step S52, the integration unit 15 uses the offline transducer decoder as a main decoder to generate initial hypotheses and calculate a score of each hypothesis (step S522). In this example, the top four hypothesis candidates among the hypothesis candidates are used. For example, in the example of FIG. 4, the top four hypothesis candidates are "GO", "GA", "GAJI", and "RO" having a high probability which are character candidates after "OHAYOU" at an immediately previous time t=t−1. Through this processing, for example, a hypothesis is generated by the offline decoder in FIG. 6 and a score is calculated.

In the process of step S522, the integration unit 15 selects the top k (for example, 4) candidates from among the candidates (top-k_pre($P_{off}(z_t)$) in a 6th line), and calculates the score of each candidate as shown in FIG. 6 (step S5221). $z_t$ is a current hypothetical text.

In the processing of step S52, the integration unit 15 also calculates, for each character string, a probability of outputting a character string of a hypothesis of the candidates obtained by the offline model, by using the online model, after step S522 ends (step S523).

The score doff of the offline is as shown in Equation (12) below, and an online score Con is calculated using Equation (13) below.

$$\alpha_{off} = \text{ext\_hyps}[l] \tag{12}$$

$$\alpha_{on} = OnScore(l, h_{on}, P_{on}(z_{t-1})) \tag{13}$$

Figures 9, 10:
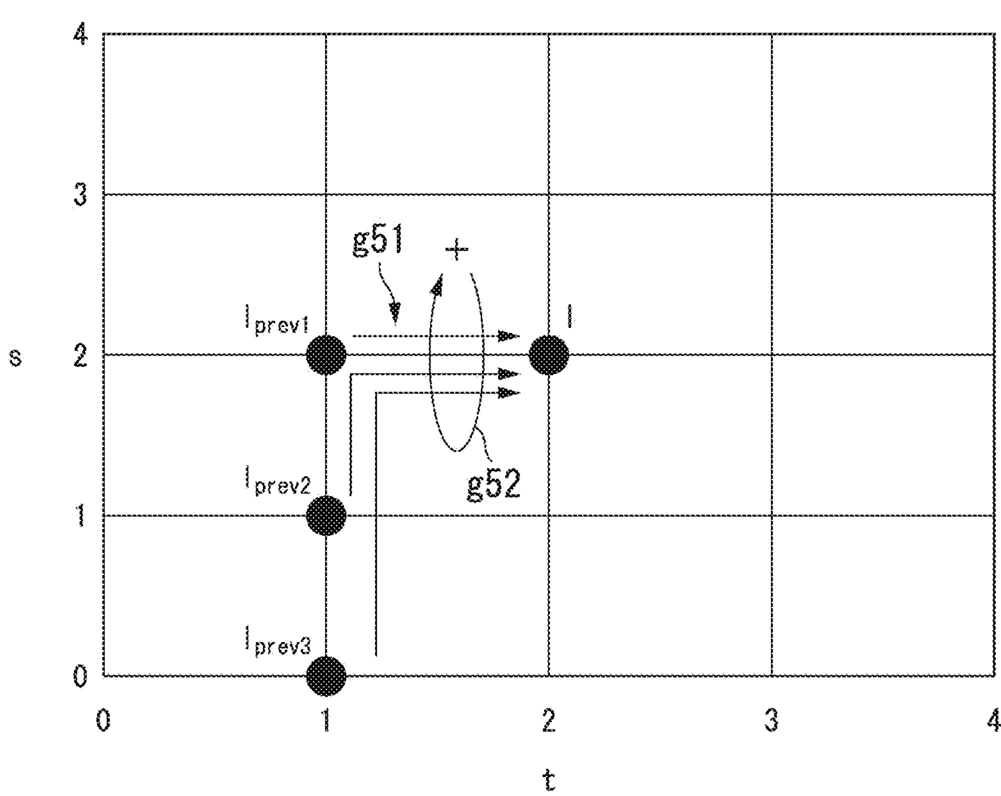
FIG. 9 is a diagram showing an example of RNN-T scoring.
FIG. 10 is a diagram showing an evaluation result when a CSJ corpus has been used.

Thus, the online transducer decoder is used to score the generated hypotheses and search for a hypothes having a higher probability of OnScore in Equation (13). Specifically, in Equation (13), a probability of generating ext_hyps from a previous hypothesis having a probability Pon($z_{t-1}$) held at time t−1 is obtained, as shown in FIG. 9. A transducer model predicts a character at each time.

FIG. 9 is a diagram showing an example of RNN-T scoring. In FIG. 9 where a horizontal axis indicates time and a vertical axis corresponds to a character, a token (character) to be output at each time is obtained.

For example, each point at time t=1 indicates that a pattern in which nothing is output ("0"), a pattern in which one character is output ("1"), and a pattern in which two characters are output ("2"). A probability of each point is held. The probability at time t2 shows that there is a need to add up all the probabilities of moving from three points in time t=1, which is an immediately previous time, to a point in time t=2 as shown by arrow g51 (arrow g52).

Since the transducer decoder is likely to emit a plurality of tokens for each time frame as described above, all possible paths need to be added up (Three arrows from time t=1 to time t=2 in FIG. 9).

Therefore, the integration unit 15 calculates an integrated score $\alpha_{joint}$ using a decoding weight μ described as in Equation (14) below. A value of the weight μ may be set depending on a usage environment, the number of times learning is performed, corpus, or the like.

$$\text{ext\_hyps}[l] = \alpha_{joint} = \mu\alpha_{on} + (1-\mu)\alpha_{off} \tag{14}$$

In step S52, the integration unit 15 adopts a more plausible hypothesis, on the basis of a weighted sum after step S523 ends (step S53).

Thus, in the present embodiment, a score for each text subjected to a hypothesis offline is obtained, a score is recalculated using the online model for the same character string as such a character string, and the score obtained online and the score obtained offline are subjected to weighted averaging so that text having the highest probability is selected.

Processing (algorithm) of the integration unit 15 described using FIG. 8 is an example, and is not limited thereto.

Evaluation

An example of a result of evaluating the speech recognition device 1 described above will be described.

An input feature quantity is data that consists of an 80-dimensional Melscale filter bank feature quantity with a window size of 512 samples and a hop length of 160 samples, and is sampled at 16 kHz.

The second encoder 13 (the full context encoder) and the first encoder 11 (the blockwise encoder) used in the evaluation were configured of two convolutional layers, a 256-dimensional linear projection layer, and 12 conformer layers with 1024 linear units. During learning, the learning processing unit 16 randomly selects a block size $L_{block}$ in Equation (2) described above from [5-50] using DB learning.

Both the transducer decoders (the first decoder 12 and the second decoder 14) used one LSTM layer with a hidden size of 256 and one linear layer with a joint size of 320 for the prediction network and the combination network.

A joint model was trained for 50 epochs using an Adam optimizer with a learning rate as 0.0015 and a learning weight λ of Equation (11) as 0.5. A decoder weight (u in Equation (12)) of the online decoder (the first decoder 12) was set to 0.3.

The speech recognition device 1 of the present embodiment performed evaluation using two data sets including corpus of spontaneous Japanese (CSJ) (Reference Document 4) and LibriSpeech 960h (Reference Document 5).

Reference 4: K. Maekawa, "Corpus of spontaneous Japanese: Its design and evaluation", in ISCA & IEEE Workshop on SSPR, 2003

Reference 5: Vassil Panayotov, Guoguo Chen, et al., "Librispeech: an asr corpus based on public domain audio books", in Proc. ICASSP, 2015, pp. 5206-5210.

Academic presentation speech data for 299 hours was used in a CSJ corpus. Character error rate/word error rate (CER/WER) was calculated for each of CSJ and LibriSpeech. In order to evaluate a delay in the online mode, the emission delay (ED) defined in Reference 6 was calculated. The ESPnet (reference document 7) toolkit was used for the evaluation.

Reference 6: Jay Mahadeokar, Yuan Shangguan, et al., "Alignment restricted streaming recurrent neural network transducer", in Proc. SLT, 2020, pp. 52-59

Reference 7: Shinji Watanabe, Takaaki Hori, et al., "ESPnet: End-to-end speech processing toolkit", in Proc. INTERSPEECH, 2018, pp. 2207-2211.

FIG. 10 is a diagram showing an evaluation result when a CSJ corpus which is a Japanese spoken corpus has been used. In FIG. 10, "Separated" is a comparative example and is an evaluation result obtained by independent processing. "Cascaded encoder" is a comparative example and is an evaluation result using cascade-connected encoders. "Parallel encoder" is an evaluation result using encoders connected in parallel (integrated encoders) according to the embodiment. "+DBT" is an evaluation result when a case where the block size has been changed at the time of learning in the present embodiment is further added. "+2-pass rescoring" is an evaluation result when rescoring using two passes in the related art is performed (see Reference 1). "+DBT+1-pass" is an evaluation result when learning is performed with the block size of the present embodiment changed, and processing in the integration unit 15 is performed. Each value is a speech recognition rate CER (%), eval1, eval2, and eval3 are names of evaluation data sets provided by a CSJ dataset, and ave is an average value.

Thus, the scheme of the present embodiment was compared with other approaches such as separately trained online or offline transducers or cascaded encoders. For a fair comparison, the cascaded encoder proposed in reference 1 was mounted and the same number of encoder layers as proposed in an architecture of the present embodiment were used.

As in FIG. 10, the present embodiment using a parallel structure, DB learning, and one-pass beam search showed the best performance in both the online and offline modes. Further, the evaluation result of the present embodiment outperformed the cascaded encoder in both the modes. In particular, the cascaded encoder of the related scheme showed no improvement in the online mode. On the other hand, the present embodiment achieved performance improvement in both the modes. Further, the one-pass beam search of the present embodiment, which is a tight combination of the online mode with the offline mode results in higher performance improvement than two-pass rescoring.

FIG. 11 is a diagram showing an example of the text that has been subjected to speech recognition using the scheme of the related art and the scheme of the present embodiment.

Reference sign g101 indicates correct answer data.

Reference sign g102 is output text when online processing is performed using the scheme of the related art.

Reference sign g103 is output text when offline processing is performed using the scheme of the related art.

Reference sign g104 is output text when online processing is performed using the trained model of the present embodiment.

Reference sign g105 is an output text when offline processing is performed using the trained model of the present embodiment.

Reference sign g106 is output text as a result of integration in the integration unit 15.

A single underline indicates an incorrect answer. A double underline indicates that text that has been a correct answer in the online processing is an incorrect answer in the offline processing.

As indicated by reference signs g104 to g106 in FIG. 11, according to the present embodiment, it is possible to improve performance (correct answer) by taking advantage of the online processing and the offline processing by integrating the online processing and the offline processing.

Figure 12:
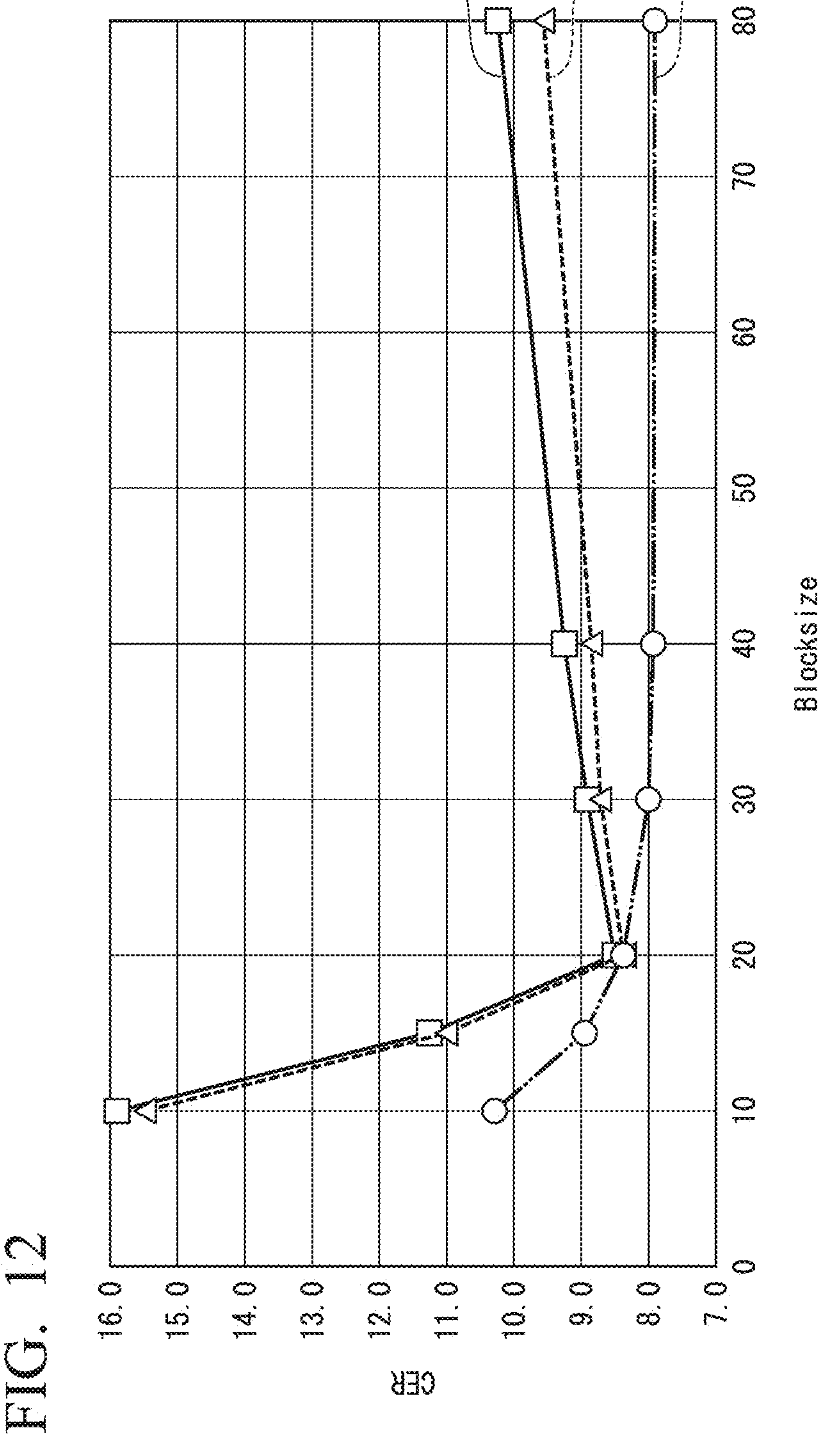
FIG. 12 is a diagram showing an example of an effect of DB learning in an online mode.

FIG. 12 is a diagram showing an example of an effect of the DB learning in the online mode. A horizontal axis indicates the block size, and A vertical axis indicates a speech recognition rate (%). A line g201 indicates a result when the online processing and the offline processing are performed separately (hereinafter referred to as "separated model") and learning is performed with the block size fixed at 20. A line g202 indicates a result when the online processing and the offline processing are integrated as described above, and learning is performed with the block size fixed at 20 without performing the DB learning. A line g203 indicates a result when the online processing and the offline processing are integrated as described above and the DB learning is performed. A value is an average value of three evaluation results.

As in FIG. 12, even in the model of the present embodiment without the DB learning, CER is slightly better than the separated model. The model of the present embodiment with the DB learning had a trade-off relationship between the block size and the CER, and exceeded the baseline in all block sizes.

FIG. 13 is a diagram showing the speech recognition rate and the ED of the model of the present embodiment with the DB learning and the separated model. As in FIG. 13, the present embodiment greatly outperformed the separated model at all the block sizes and maintained equivalent ED at substantially all the block sizes. That is, according to the present embodiment, a calculation time did not increase, and a calculation cost did not increase.

Figure 14:
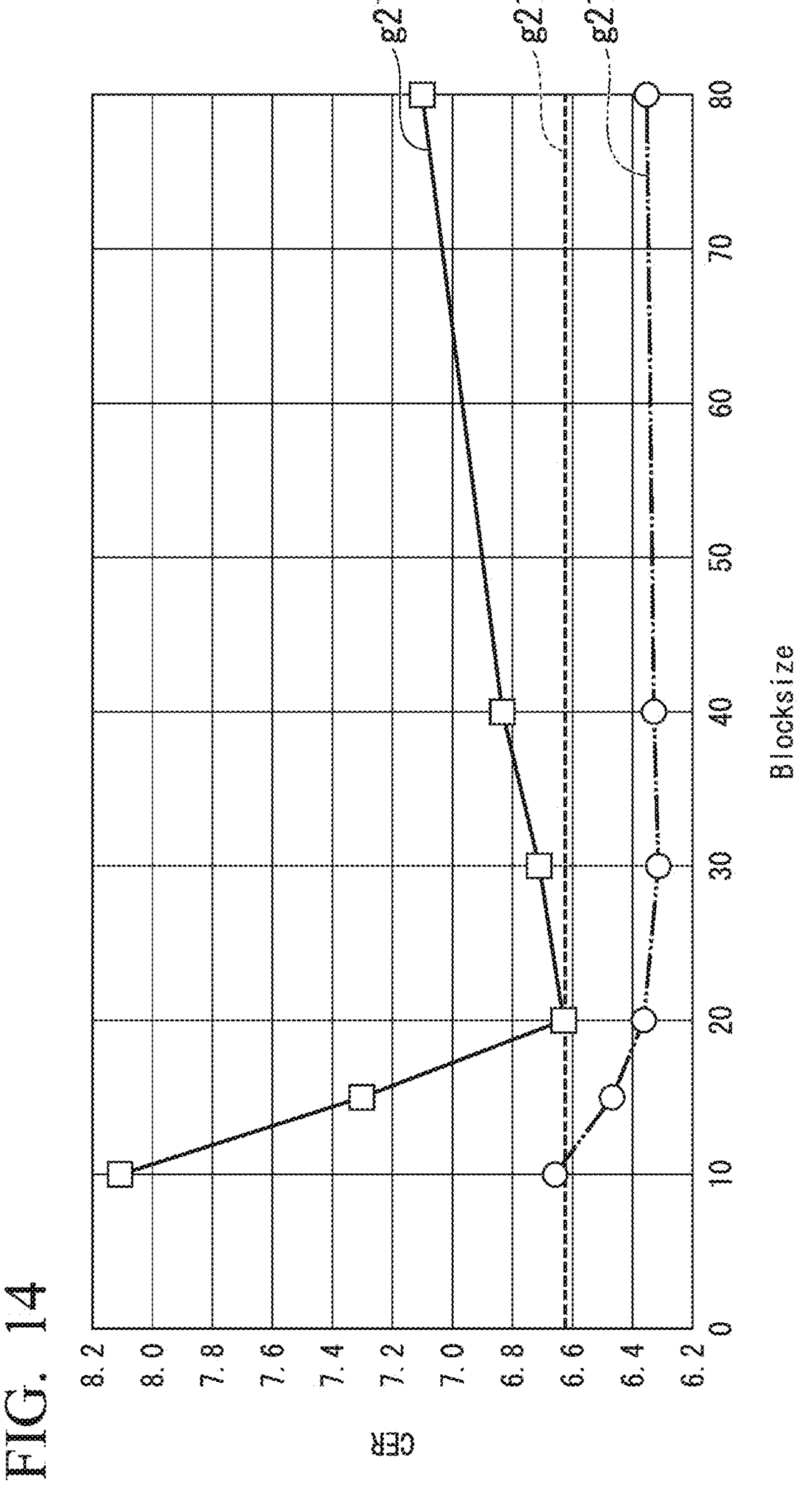
FIG. 14 is a diagram showing a relationship between a block size and the CER in an offline mode of CSJ.

FIG. 14 is a diagram showing a relationship between the block size and the CER in the offline mode of CSJ. A horizontal axis indicates the block size, and a vertical axis indicates the speech recognition rate CER (%). A value is an average value of three evaluation results. Line g211 indicates an evaluation result of the offline model of the separated model. Line g212 indicates an evaluation result when there is processing of the integration unit 15 of the present embodiment, and learning is performed with the block size fixed at 20 without the DB learning. Line g213 indicates an evaluation result when there is processing in the integration unit 15 of the present embodiment and there is the DB learning.

When the block size was 20, the model of the present embodiment trained with the block size of 20 slightly outperformed the separated model. In a case where there is the DB learning of the present embodiment, CER equivalent to or higher than that of the separated model has been achieved at all block sizes. In particular, when the DB learning was also performed using the model of the present embodiment, the robustness of the offline mode was improved, and when the block size was 10 or more, the baseline was exceeded.

As described above, in the present embodiment, the following three things are performed.

I. Integration of Encoder Outputs at the Time of Learning is Performed.

The online encoder is better in local feature extraction, while the offline encoder is better in global feature extraction. Therefore, in the present embodiment, it was possible to improve the performance of both the models by integrating the encoder outputs and performing multitask learning.

II. Learning is Performed with the Randomly Changed Block Size.

According to the present embodiment, it was possible to improve the robustness of the decoder by randomly changing the block size of the online encoder at the time of training. The block size can be changed freely by the user (trade-off between accuracy and response can be adjusted)

III. Integration of Decoder Outputs is Performed.

The online model and offline model have pros and cons. Therefore, in the present embodiment, decoding results are also similarly integrated. Specifically, the hypotheses output by the offline model were rescored by the online model.

With using these schemes, according to the present embodiment, the performance in both the online mode and the offline mode has been improved. That is, according to the present embodiment, the speech recognition using the E2E model can improve the robustness.

The DB learning of the present embodiment improves the robustness of the offline mode, and enables flexible selection of the block size in the online mode. Further, in the present embodiment, the one-pass beam search using the online and offline transducer decoders is performed, thereby further improving the performance of the offline mode.

In the present embodiment, since parallel connection rather than the cascade is made, it is possible to avoid the accumulation of errors (error accumulation) that often occurs in a cascade structure using the scheme of the related art.

In the speech recognition device 1 described above, the model may be provided via a cloud or a server.

An example in which the model is trained using a Japanese corpus and the speech recognition is performed on Japanese speech has been described in the example described above, but the present invention is not limited thereto. Even when the speech is in a language other than Japanese, the present embodiment can be applied by causing the model to be trained with a corpus of a language to be recognized.

Although an example in which the DB learning, encoder integration, decoder integration, and one-pass beam search described above are performed has been described, it is possible to obtain effects even when all of such processing are not performed as shown in the evaluation results. That is, the speech recognition device 1 may perform at least one of the DB learning, the encoder integration, the decoder integration, and the one-pass beam search.

A program for realizing all or some of the functions of the speech recognition device 1 according to the present invention may be recorded on a computer-readable recording medium, and the program recorded on this recording medium may be read into a computer system and executed so that all or some of the processing performed by the speech recognition device 1 are performed. It is assumed that the "computer system" here includes hardware such as an OS or peripheral devices. The "computer system" includes a WWW system including a home page providing environment (or display environment). The "computer-readable recording medium" refers to a portable medium such as a flexible disk, a magneto-optical disk, a ROM, and a CD-ROM, or a storage device such as a hard disk built into a computer system. Further, it is assumed that the "computer-readable recording medium" includes a medium in which a program is held for a certain period of time, like a volatile memory (RAM) inside a computer system that serves as a server or client when a program is transmitted via a network such as the Internet or a communication line such as a telephone line.

The program may be transmitted from a computer system having the program stored in a storage device or the like to another computer system via a transmission medium or by a transmission wave in the transmission medium. Here, the "transmission medium" that transmits the program refers to a medium having a function of transmitting information, such as a network (communication network) such as the Internet or a communication line such as a telephone line. The program may be for realizing some of the functions described above. Further, the program may be a so-called difference file (difference program) in which the above-described functions can be realized in combination with the program already recorded in the computer system.

The mode for carrying out the present invention has been described above using the embodiments, but the present invention is not limited to these embodiments in any way, and various modifications and substitutions can be made without departing from the gist of the present invention.

What is claimed is:

1. A speech recognition device for performing speech recognition using an end-to-end model, the speech recognition device comprising:

an encoder that is a model that converts an input speech signal into a characteristic expression;

a decoder that is a model that converts speech data into text using an output of the encoder; and a learning unit configured to randomly select a block length of the speech signal input to the encoder and cause the encoder and the decoder to perform learning, wherein the encoder includes a first encoder configured to perform processing online and a second encoder configured to perform processing offline, the decoder includes a first decoder configured to perform processing online and a second decoder configured to perform processing offline, and the speech recognition device further comprises:

an integration unit configured to rescore an output of the first decoder and an output of the second decoder at the time of inference to output a final recognition result, and wherein the second decoder integrates an output of the first encoder with an output of the second encoder at the time of training to perform learning of the second decoder.

2. The speech recognition device according to claim 1, wherein the second decoder stacks the output of the first encoder and the output of the second encoder in a vertical direction.

3. The speech recognition device according to claim 1, wherein the integration unit performs inference on the speech data acquired using the second decoder to calculate a first score, calculates a second score for the same character string as a character string inferred by the second decoder, by using the first encoder, calculates a weighted sum of the first score and the second score, and performs rescoring to determine text to be inferred.

4. A speech recognition method for a speech recognition device for performing speech recognition using an end-to-end model, the speech recognition method comprising:

converting, by an encoder, an input speech signal into a characteristic expression;

converting, by a decoder, speech data into text using an output of the encoder; and randomly selecting, by a learning unit, a block length of the speech signal input to the encoder and causing the encoder and the decoder to perform learning, wherein the encoder includes a first encoder configured to perform processing online and a second encoder configured to perform processing offline, the decoder includes a first decoder configured to perform processing online and a second decoder configured to perform processing offline, and the speech recognition device further comprises:

an integration unit configured to rescore an output of the first decoder and an output of the second decoder at the time of inference to output a final recognition result, and wherein the second decoder integrates an output of the first encoder with an output of the second encoder at the time of training to perform learning of the second decoder.

5. A non-transitory machine-readable medium having a program stored therein, the program causing a computer for a speech recognition device for performing speech recognition using an end-to-end model including an encoder and a decoder to execute:

a first conversion step of converting an input speech signal into a characteristic expression;

a second conversion step of converting speech data into text using an output of the first conversion step; and a step of randomly selecting a block length of the speech signal input to the encoder and causing the encoder and the decoder to perform learning, wherein the encoder includes a first encoder configured to perform processing online and a second encoder configured to perform processing offline, the decoder includes a first decoder configured to perform processing online and a second decoder configured to perform processing offline, and the speech recognition device further comprises:

an integration unit configured to rescore an output of the first decoder and an output of the second decoder at the time of inference to output a final recognition result, and wherein the second decoder integrates an output of the first encoder with an output of the second encoder at the time of training to perform learning of the second decoder.

* * * * *